United States Patent

[11] 3,568,885

[72] Inventor Robert L. Spencer
 Huntsville, Ala.
[21] Appl. No. 845,990
[22] Filed July 30, 1969
[45] Patented Mar. 9, 1971
[73] Assignee The United States of America as represented by the administrator of the National Aeronautics and Space Administration

[54] THICKNESS MEASURING AND INJECTION DEVICE
 6 Claims, 3 Drawing Figs.

[52] U.S. Cl. .................................................. 1, 141/258,
 222/49, 222/137
[51] Int. Cl. .................................................. B67d 5/06
[50] Field of Search ........................................ 141/251,
 258, 329; 222/49, 23, 137; 118/(Inquired);
 73/(Inquired); 33/(Inquired)

[56] References Cited
 UNITED STATES PATENTS
 3,117,696 1/1964 Herman et al. ............... 222/137
 3,159,312 12/1964 Van Sciver, II ............... 222/137

*Primary Examiner* — Lloyd L. King
*Attorneys* — L. D. Wofford, Jr., W. H. Riggins and G. T. McCoy ABSTRACT: A device for measuring the thickness of a surface material, such as spray-on foam insulation applied on a backing, and injecting a repair substance into the material. An injection gun comprises a needle that penetrates the thickness of the material being measured while a slidable thickness-indicating rod is pushed inwardly of the gun by an amount equal to the penetration of the needle. Two separate syringe cylinders are provided for containing fluid components that form foam insulation material when mixed and as the needle is withdrawn from the foam material these components are injected through separate needle passages into the cavity formed by the needle penetration.

PATENTED MAR 9 1971

3,568,885

INVENTOR
ROBERT L. SPENCER

BY
Wayland H. Riggins
ATTORNEYS

THICKNESS MEASURING AND INJECTION DEVICE

ORIGIN OF INVENTION

The invention described herein was made by an employee of the United States Government and may be manufactured and used by or for the Government for governmental purposes without the payment of any royalties thereon or therefor.

BACKGROUND OF THE INVENTION

This invention relates generally to measuring and dispensing devices and more particularly to a combination measuring and injection device for measuring the thickness of a material and injecting a repair substance into the material simultaneous with the withdrawal of the device from the material.

Among the materials currently being used for thermal insulation purposes is low density foam material, an example of which is polyurethane "spray-on foam insulation." One area of extensive use of foam insulation is found in the fabrication of space vehicles wherein very effective and light weight insulation is required in the insulation of tanks holding cryogenic propellants such as liquid hydrogen and liquid oxygen.

Since the effectiveness of foam insulation is a critical matter in the manufacturing of space vehicles, improved devices and techniques are needed for making various tests and measurements of the insulation after it has been applied. With regard to spray-on foam insulation, wherein the thickness of the applied layer of foam is subject to variation, it is necessary to carefully measure the insulation thickness at frequent points in certain areas. Prior devices for thickness measuring are not satisfactory in that they are not sufficiently accurate or they produce permanent cavities in the foam insulation which is always undesirable and, in some instances, intolerable.

SUMMARY OF THE INVENTION

The invention comprises an injection gun having a projecting needle for penetrating the material being measured. A retractable thickness-indicating rod projects from the body of the injection gun parallel with and the same distance as the needle. As the needle penetrates the material the end of the indicating rod is in contact with the adjacent surface of the material and is pushed inwardly of the gun a distance equal to the amount of penetration of the needle. The displacement of the indicating rod is read from a scale overlying the rod. As the needle is withdrawn the cavity formed by the penetrating needle is filled by injecting fluid repair substance through the needle into the cavity.

Accordingly, it is a general object of the present invention to provide an improved thickness measuring device.

A more specific object of the invention is to provide a device for accurately measuring the thickness of surface material applied on a backing panel without permanently damaging the material being measured.

Another object of the invention is to provide a means for penetrating a layer of spray-on foam insulation and filling the penetration cavity with repair foam material.

These and other objects and advantages of the invention will become apparent upon reference to the following specification, attendant claims and drawing.

DESCRIPTION OF THE PREFERRED EMBODIMENT

Figure 1:
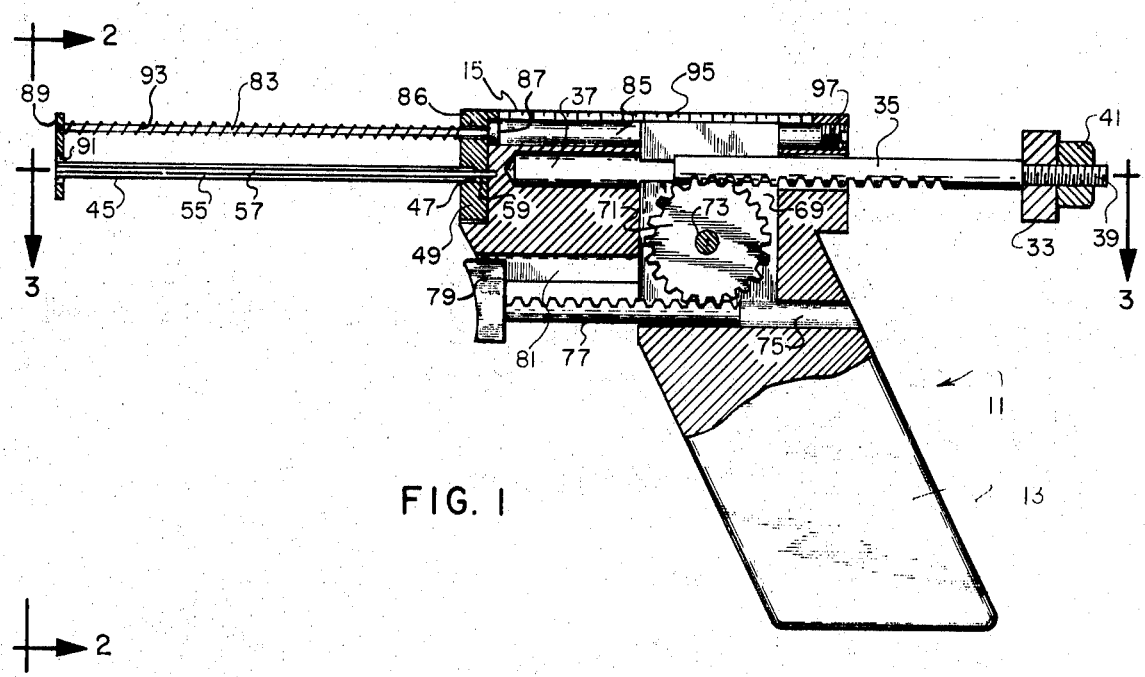
FIG. 1 is a vertical longitudinal cross-sectional view of a measuring and injection device embodying the present invention (the needle of the injection device is enlarged out of proportion for clarity).

Referring to the drawing, the measuring and injection device comprises a main body 11 having a gun configuration with a grip portion 13 and a barrel portion 15. The body 11 is shown as an integral unit and is preferably made of a lightweight material such as aluminum.

Formed in the barrel portion 15 are a pair of cylinders 17 (FIG. 3) within which are fitted pistons 19 equipped with elastic sealing rings 21. The pistons 19 are connected to rods 23 that extend through holes 25 in threaded nuts 27 screwed into the ends of the cylinders 17. The opposite ends of the cylinders 17 are closed by threaded plugs 29.

The ends of the rods 23 are reduced in diameter at 31 to receive a connector 33 that interconnects the rods 23 and a rack 35. The rack 35 is slidably fitted in a bore 37 between the cylinders 17. The connector 33 fits over a reduced diameter end portion 39 of the rack 35 and is secured to the rack 35 by a nut 41 and to the rods 23 by nuts 43.

Figure 3:
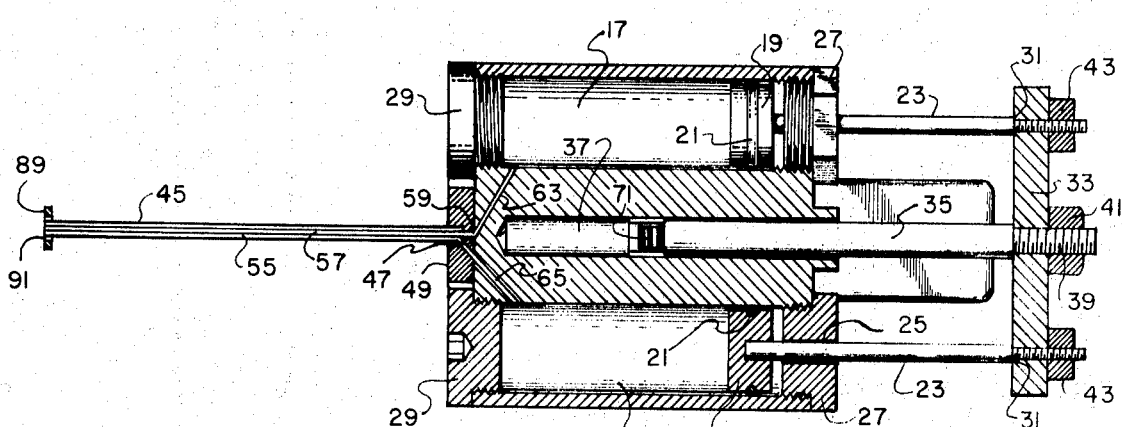
FIG. 3 is a cross-sectional view taken along line 3-3 of FIG. 1.
Figure 2:
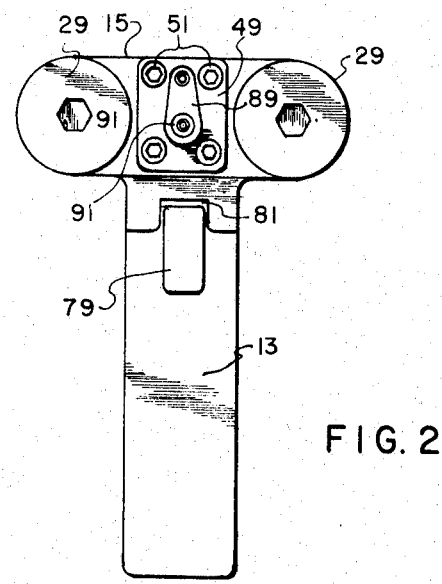
FIG. 2 is a front elevational view taken along line 2-2 of FIG. 1.

A stainless steel needle 45 is joined to the front of the body 11 substantially in alignment with the bore 37. The joining end of the needle is welded in a recess 47 of a plate 49 which is secured to the body 11 by screws 51 (FIG. 2). The needle 45 comprises an outer conduit 55 and an inner conduit 57, the latter of which extends through and is welded in a countersunk hole 59 in the plate 49. The inner conduit 57 of the needle communicates with one of the cylinders 17 through a passageway 63 and the outer conduit 55 communicates with the other cylinder 17 through a passageway 65 (FIG. 3).

As shown in FIG. 1, the body 11 has a slot 69 therein that coincides in part with the bore 37 containing the rack 35. A pinion 71 is installed in the slot 69 for rotation on a transverse pin 73. At the lower end of the slot 69 is a second bore 75 that receives a driving rack 77 adapted to be actuated by pressing a trigger piece 79 with the trigger finger. The trigger piece 79 slides in a groove 81 in the body 11.

A thickness-indicating rod 83 (FIG. 1) is slidably disposed in a bore 85 located near the top of the body 11 and being vertically aligned with the bore 37. The rod also slides in a hole 86 in the plate 49 and has a stop portion 87 that abuts the inner surface of the plate 49 to permit the rod to project from the plate 49 a distance equal to the projecting length of the needle 45. Attached to the end of the rod 83 is a guide piece 89 that encompasses the needle 45 in an opening 91 which opening is slightly larger in diameter than the needle. A compression spring 93 is fitted over the indicating rod 83 between the guide piece 89 and the plate 49 to bias the rod toward the extended position shown in FIG. 1.

A transparent scale 95 overlies the bore 85 so that the position of the indicating rod 83 may be observed to determine the amount of retraction of the rod. The back end of the bore 85 is closed by a screw 97.

In using the invention the cylinders 17 are filled with injection fluid by removing the plugs 29 and retracting the pistons to the position shown in FIG. 3. Upon replacing the plugs 29 the needle is inserted into the material being measured. When measuring the thickness of a surface material applied to a metal backing, as in the case of spray-on foam insulation, the needle penetrates the material until the tip contacts the metal backing. The guide piece 89 of the indicating rod 83 bears on the surface of the material and the rod is pushed inwardly of the body 11 a distance equal to the distance the needle penetrates the material. This distance and thus the thickness of the material is read from the scale 95.

As the needle is withdrawn from the material the trigger piece 79 is pressed to actuate the racks 77 and 35 to force injection fluid from cylinders 17 into the cavity made by the needle. When the material being measured is spray-on foam insulation, the fluid in one of the cylinders 17 is a prepolymer and the fluid in the other cylinder is a basic resin. These two fluids mix as they issue from the end of the needle and form foam material that fills and repairs the needle cavity.

I claim:

1. A thickness measuring and injection device comprising:

a. an injection gun having a handle portion and a barrel portion;
b. said barrel portion including a cylinder for containing an injection fluid;
c. an injection needle carried by said barrel portion and projecting forwardly of said barrel portion;
d. said needle having a conduit communicating with said cylinder;
e. a movable thickness-indicating rod carried by said barrel portion, said rod projecting forwardly of said barrel portion and being disposed substantially parallel with said needle;
f. means for guiding said thickness-indicating rod during movement inwardly and outwardly of said barrel portion; and
g. means for forcing fluid out of said cylinder and through said needle.

2. The invention as defined in claim 1 wherein said barrel portion comprises two cylinders and said needle comprises two conduits, one of said cylinders communicating with one of said conduits and the other of said cylinders communicating with the other of said conduits.

3. The invention as defined in claim 1 wherein said thickness-indicating rod is spring-biased outwardly of said gun and projects a distance equal to the projecting length of said needle.

4. The invention as defined in claim 1 wherein said means for guiding said thickness-indicating rod includes a guide piece secured to the end of said rod, said guide piece having an opening therein receiving said needle.

5. The invention as defined in claim 2 wherein said means for forcing fluid out of said cylinders comprises a piston in each of said cylinders, a piston rod connected to each of said pistons, means connected to each of said rods for actuating said pistons simultaneously.

6. The invention as defined in claim 5 wherein said means for actuating said pistons comprises a driven rack connected to each of said piston rods, a pinion within said gun engaging said driven rack, a driving rack engaging said pinion, an end of said driving rack disposed in the trigger region of said gun whereby said driving rack may be moved by the trigger finger to drive said pinion.